(12) United States Patent
Kwaterski

(10) Patent No.: US 9,132,881 B2
(45) Date of Patent: Sep. 15, 2015

(54) RUBBER ISOLATION SYSTEM INCORPORATED BETWEEN THE COMPRESSION ROD AND THE GAS SPRING ASSEMBLY OF A BICYCLE FORK

(75) Inventor: Edward C. Kwaterski, Cedarburg, WI (US)

(73) Assignee: Hayes Bicycle Group, Inc., Mequon, WI (US)

( * ) Notice: Subject to any disclaimer, the term of this patent is extended or adjusted under 35 U.S.C. 154(b) by 172 days.

(21) Appl. No.: 13/481,109

(22) Filed: May 25, 2012

(65) Prior Publication Data

US 2013/0313803 A1 Nov. 28, 2013

(51) Int. Cl.
*F16F 9/512* (2006.01)
*B62K 25/08* (2006.01)
*F16F 9/34* (2006.01)
*F16F 9/02* (2006.01)
*F16F 9/32* (2006.01)

(52) U.S. Cl.
CPC .............. *B62K 25/08* (2013.01); *F16F 9/0218* (2013.01); *F16F 9/3228* (2013.01); *F16F 9/3415* (2013.01); *F16F 9/512* (2013.01); *F16F 9/5123* (2013.01)

(58) Field of Classification Search
CPC ....... B62K 25/04; B62K 25/08; F16F 9/3228; F16F 9/0218; F16F 9/486; F16F 9/466; F16F 9/43; F16F 9/0209; F16F 9/3415; F16F 9/50; F16F 9/512; F16F 9/5123; F16F 9/5126; F16F 9/516; F16F 9/5165
USPC .............. 280/276; 188/297, 316, 313, 322.1, 188/221.11; 267/82, 90, 217
See application file for complete search history.

(56) References Cited

U.S. PATENT DOCUMENTS

| | | | | | |
|---|---|---|---|---|---|
| 4,331,224 | A | * | 5/1982 | Sano | 188/282.8 |
| 4,561,669 | A | * | 12/1985 | Simons | 280/276 |
| 4,791,712 | A | * | 12/1988 | Wells et al. | 29/888.042 |
| 6,095,541 | A | * | 8/2000 | Turner et al. | 280/276 |
| 6,105,988 | A | * | 8/2000 | Turner et al. | 280/276 |
| 7,451,860 | B2 | * | 11/2008 | Nevoigt et al. | 188/322.22 |
| 7,837,180 | B2 | * | 11/2010 | Jordan | 267/64.26 |
| 8,033,368 | B2 | * | 10/2011 | Becker et al. | 188/322.13 |
| 2003/0051957 | A1 | * | 3/2003 | Lemieux | 188/322.15 |
| 2004/0017035 | A1 | * | 1/2004 | Treder et al. | 267/220 |
| 2008/0041681 | A1 | * | 2/2008 | Shipman | 188/319.2 |
| 2009/0001684 | A1 | * | 1/2009 | McAndrews et al. | 280/276 |
| 2010/0314209 | A1 | * | 12/2010 | Gonzalez et al. | 188/297 |
| 2011/0083930 | A1 | * | 4/2011 | Laird et al. | 188/275 |
| 2011/0187076 | A1 | * | 8/2011 | Gonzalez et al. | 280/276 |

* cited by examiner

*Primary Examiner* — Joseph Rocca
*Assistant Examiner* — Daniel Yeagley

(57) ABSTRACT

A bicycle fork leg including a pressurized gas chamber functioning as a shock absorber and a piston adjacent to the bicycle fork leg. A movable compression rod which moves toward the piston when a force is imparted to the bicycle leg. A rubber or compliant member within the piston. The movable compression rod coming in contact with the compliant member to reduce low amplitude high frequency shocks.

8 Claims, 2 Drawing Sheets

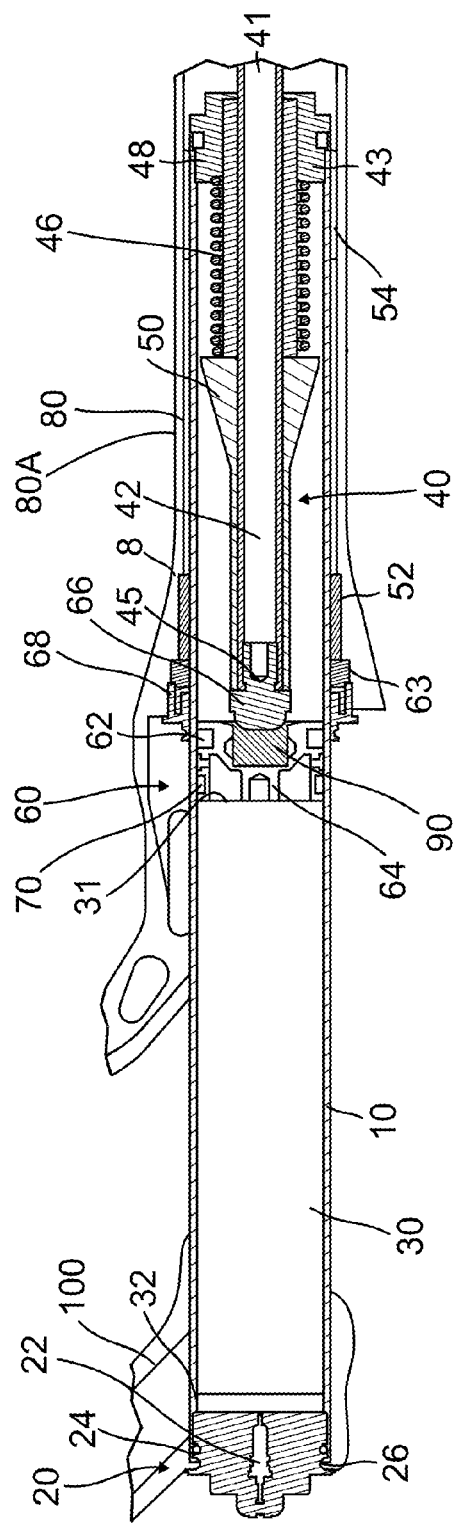
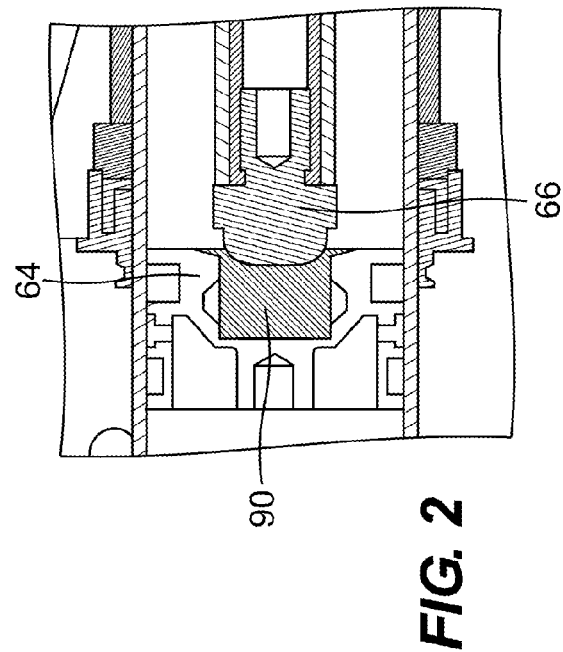
FIG. 1
FIG. 2

RUBBER ISOLATION SYSTEM INCORPORATED BETWEEN THE COMPRESSION ROD AND THE GAS SPRING ASSEMBLY OF A BICYCLE FORK

BACKGROUND OF THE INVENTION

1. Field of the Invention

The present invention relates to the field of bicycle forks and in particular, to the spring system incorporated into bicycle forks.

2. Description of the Prior Art

A bicycle fork is the portion of a bicycle that holds the front wheel and allows the rider to steer and balance the bicycle. A fork consists of two fork ends which hold the front wheel axle, two blades which join at the fork crown, and a steering tube which is attached to the handle bars.

On most mountain bicycles, the fork contains a set of shock absorbers so that the blades typically consist of upper and lower telescoping tubes which are called legs.

A portion of the legs is the shock absorber which usually consists of two parts: a spring and a damper. The spring can be a metal coil but more commonly is now compressed air. Air springs utilize the thermodynamic property of gasses that their pressures increase as they are compressed adiabatically. The spring constant can be adjusted by adjusting the air pressure. This allows a fork to be tuned to a rider's weight.

The damper usually forces oil to pass through one or more small openings in the suspension fork.

In a traditional system, the compression rod which is usually a hard material such as aluminum or plastic pushes directly on the piston. The piston also usually is made out of aluminum, plastic or similar material. Until the load in the compression rod exceeds the static friction of the piston assembly seal, the suspension does not compress. The result is an undesirable harshness.

U.S. Pat. No. 6,592,136 discloses a standard connection between a piston assembly and a compression rod assembly. U.S. Pat. No. 2,212,759 discloses rubber isolators 28 and 47.

There is a significant need for an improved suspension system in a bicycle fork that addresses the problems set forth above.

SUMMARY OF THE INVENTION

The present invention is an isolator within a piston to reduce the transmission of high frequency/low amplitude vibration to the rider and eliminate piston seal breakaway harshness. The suspension consists of a telescoping leg within a lower casting. The leg contains a top cap assembly fixed to the leg, a piston assembly movable within the leg, and a lower cap assembly fixed to the leg. The piston assembly contains a seal which contacts the inside of the leg. The leg, top cap assembly and piston assembly define a pressurized gas chamber. A valve in the top cap assembly is fixed to allow adjustment of the gas pressure within the chamber. A compression rod assembly is fixed to the lower casting and contains a head that contacts an isolator within the piston assembly.

The compression rod assembly applies a load to the piston assembly when a bump is encountered. If the load is below the static friction between the piston assembly seal and fork leg, then the isolator deforms, allowing compression of the suspension without translation of the piston. Once the load exceeds the static friction of the piston assembly seal, the piston translates which reduces the volume of the gas chamber, resulting in a higher pressure.

The fork consists of a telescoping assembly with a spring system using a compressed air chamber. The compression rod moves upward with the wheel when a bump is encountered. This translates the piston, compressing the air chamber, resulting in a higher pressure. This creates a position dependent force, or spring. In a traditional system, the rod, which is usually a hard material like aluminum or plastic, pushes directly on the piston. The piston is also usually made of aluminum, plastic or similar material. In the present invention system, a rubber or other compliant member creates a buffer between the compression rod and piston.

The present invention has the following advantages:

The invention provides a soft connection between the compression rod and the piston, thereby isolating high frequency/low amplitude vibration;

The invention eliminates harshness transmitted to the rider due to static friction of the piston seal; and The present invention reduces friction effects transmitted to the rider due to seal drag on the moving piston.

It is an object of the present invention to put a rubber piece between the end of the compression rod and the piston itself so that the rubber can compress and allow the wheel to move slightly before it has to break the seal friction and start the piston moving upwards. This has the biggest effect on low amplitude high frequency types of bumps.

It is a further object of the present invention to add a rubber seal around the OD of the piston that keeps the air captured in the chamber and there is a rubber cylinder pressed into the bottom of the piston and a compression rod contacts that rubber. That is the innovation. It is an isolator between the rod and the piston.

It is additionally an object of the present invention to lessen the transmission of harshness through to the rider. For example, if the piston seal creates five pounds of friction then that friction creates a step force that would transmit through to the rider before the tire can move upwards. By putting a compliant member between the compression rod and the piston it can allow the wheel to begin its movement before it has to break that friction and transfer the force to the piston.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a side elevational view in partial cross-section of a bicycle fork including the present invention seal.

FIG. 2 is a detailed cross-sectional view illustrating the present invention seal in place between the piston and the gas chamber compression spring.

DETAILED DESCRIPTION OF THE PREFERRED EMBODIMENTS

Figure 1A:
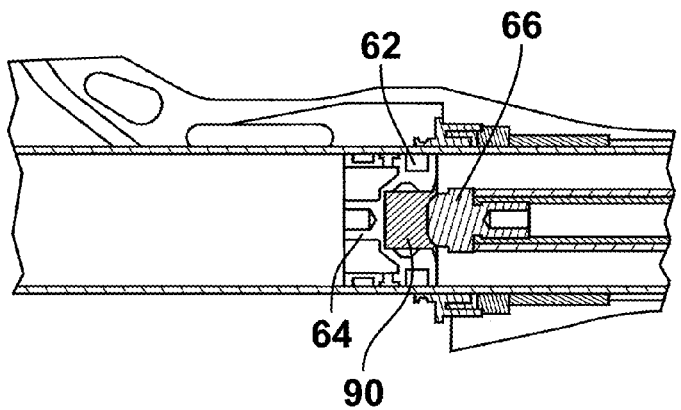
FIG. 1A-1C are detailed cross-sectional views of the fork of FIG. 1 showing progressive operation of the isolator under force at the compression rod to overcome the static friction of the piston assembly.
Figure 1B:
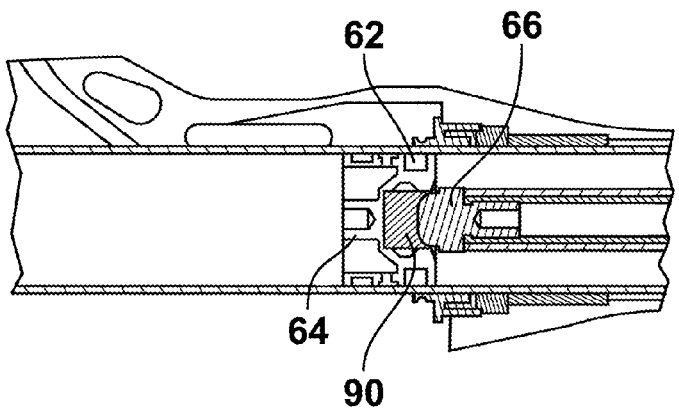
Figure 1C:
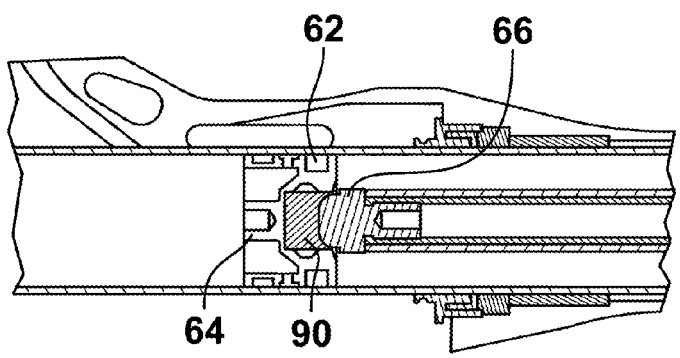

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 and 2, there is illustrated one-half of a bicycle fork leg 10 which includes conventional parts and the present invention incorporated into the fork leg 10. A conventional bicycle fork has two such fork legs 10 which are parallel to each other and supported by a crown 100. The crown is affixed to a steerer tube which in turn is affixed to handlebars.

The fork leg 10 includes a top cap assembly 20 which is fixed to the fork leg 10. The top cap assembly includes a pressurized gas chamber 30 which is filled with gas such as air and which acts as a shock absorbing spring. The pressurized gas chamber 30 includes a valve 22 by which the amount of gas within the pressurized gas chamber can be adjusted and a seal 24 to seal the top end of the pressurized gas chamber 30. The valve 22 in the top cap assembly 20 is fixed to allow adjustment of the gas pressure within the chamber of the pressurized gas chamber 30. The valve 22 and seal 24 are incorporated into the top cap body 26 located at the top end 32 of the pressurized gas chamber 30.

The fork leg 10 also comprises a piston assembly 60 which is movable within the fork leg 10. The piston assembly 60 includes a seal 62 which contacts the inside 8 of the fork leg 10.

The piston assembly 60 also includes a piston body 64, a glide ring 70 and a rubber piece 90. Partially inserted into the fork leg 10 is a compression rod assembly 40 which includes a compression rod 42 which is movable up and down within the fork leg 10 and towards the pressurized gas chamber 30 when the wheel to which the fork leg 10 is attached hits a bump. To facilitate the up and down movement of the compression rod 42, the compression rod assembly 40 further comprises a top out spring 46 adjacent the lower end 41 of the compression rod assembly 40, which in turn is connected to a top out spacer 50. The compression rod assembly 40 further includes a head 66.

A lower casting 80 includes an upper bushing 52, a lower bushing 54, a foam ring 63, and a wiper 68 to facilitate movement of the leg 10. The glide ring 70 further facilitates movement of the piston 64 which is pushed by the compression rod assembly 40. The piston assembly 60 lies adjacent to the lower end 31 of the gas compression chamber 30. The lower end 48 of the fork leg 10 includes an end cap body 43.

The present invention is the rubber piece 90 more generally defined as a compliant member, which functions as an isolation member between the head 66 of top end 45 of the compression rod 40 and the piston 64 so that upon an upward movement of the compression rod 40, the rubber piece 90 can be compressed by a few millimeters. That is the innovation of the present invention. The rubber piece or cylinder 90 is an isolator between the compression rod 40 and the piston 64.

Discussed further, the present invention is to place a rubber piece 90 between the top end 45 of the compression rod 42 and the piston 64 so that the rubber 90 can compress a few millimeters which allows the wheel to move slightly before it has to break the seal friction required for piston movement. This invention is expected to have the highest effect on low magnitude high frequency types of bumps.

The insertion of the rubber piece 90 provides a soft connection between the compression rod assembly 40 and the piston assembly 60, thereby isolating high frequency, low amplitude vibrations.

In summary, the fork consists of a telescoping assembly with the spring system using a compressed air chamber 30. A compression rod 42 moves with a wheel to which the fork is attached when a bump is encountered by the wheel. This upward movement of the compression rod 40 translates to a piston 64, compressing the air chamber 30, resulting in a higher pressure.

The suspension consists of a fork leg 10 telescoping within the lower casting 80. The fork leg 10 contains a top cap assembly 20 fixed to the fork leg 10, a piston assembly 60 movable within the fork leg 10 and an end cap body 43 affixed to the fork leg 10. The piston assembly 60 contains a seal 62 which contacts the inside of the fork leg 10. The fork leg 10, top cap assembly 20 and piston assembly 60 define a pressurized gas chamber 30. A valve 22 in the top cap assembly 20 allows adjustment of the gas pressure within the chamber. A compression rod assembly 40 is fixed to the lower casting and contains a head 66 that contacts the rubber piece 90 within the piston assembly 60. The lower casting is illustrated with the inner surface of the lower casting numbered 80 and the outer surface of the lower casting numbered 80A.

The compression rod assembly 40 applies a load to the piston assembly 60 when a bump is encountered. If the load is below the static friction of the piston seal 62, the rubber piece 90 deforms, allowing compression of the suspension without translation of the piston body 64. Once the load exceeds the static friction of the piston seal 62, the piston body 64 translates which reduces the volume of the pressurized gas chamber 30 resulting in a higher pressure.

The key to the present invention is an isolator within a piston to reduce the transmission of high frequency amplitude vibration to the rider and eliminate piston seal breakaway harshness.

In a traditional system, the compression rod 42 which is usually a hard material like aluminum or plastic pushes directly on the piston body 64, also usually made of aluminum, plastic or similar material. The innovation of the present invention is the insertion of a rubber or other compliant member to create a buffer between the compression rod 42 and the piston body 64.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:
1. A fork leg comprising:
(a) a pressurized gas chamber adjacent to a piston assembly which is adjacent to a compression rod assembly including a movable compression rod;
(b) the compression rod assembly further includes a top out spring adjacent a lower end of the compression rod assembly, which top out spring in turn is connected to a top out spacer, the top out spring facilitates movement of the compression rod, the compression rod includes a head adjacent to and coming in contact with piston of the piston assembly; and
(c) a compliant member is adjacent the piston and adjacent to the head of the movable compression rod, and when a force causes the compression rod to come in contact with the compliant member, the compliant member deforms reducing high frequency low amplitude vibration without translation of the piston.

2. The fork leg in accordance with claim 1, further comprising: the compliant member is made of rubber.

3. A fork leg comprising a piston with a seal at one end of a pressurized gas chamber which serves as a shock absorbing spring; an isolation member adjacent the piston and adjacent a head of a movable compression rod; wherein the piston is configured to move when a static friction provided by the seal is overcome by a force on the movable compression rod; wherein the isolation member is configured so that the force on the movable compression rod causes the head of the movable compression rod to deform the isolation member so that the isolation member absorbs the force and the movable compression rod moves without translation of the piston until the static friction provided by the seal is overcome.

4. The fork leg of claim 3 further comprising a top out spring facilitating movement of the compression rod.

5. The fork leg of claim 3 wherein the isolation member acts as an isolator to isolate low amplitude high frequency forces.

6. The fork leg of claim 3 wherein the isolation member comprises a compliant member.

7. The fork leg of claim 3 further comprising a piston assembly including the piston; a compression rod assembly including the compression rod which is movable up and down within the fork leg and towards the pressurized gas chamber; and wherein the isolation member comprises a rubber piece between the head of the compression rod and the piston assembly; the rubber piece functioning as an isolator between the compression rod assembly and the piston assembly to isolate low amplitude high frequency vibrations.

8. A fork leg in accordance with claim 3 wherein the isolation member comprises a rubber member.

\* \* \* \* \*